(12) United States Patent
Nakata

(10) Patent No.: US 6,615,889 B1
(45) Date of Patent: Sep. 9, 2003

(54) HEAVY DUTY RADIAL TIRE

(75) Inventor: Hiroshi Nakata, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/581,474

(22) PCT Filed: Jul. 28, 1999

(86) PCT No.: PCT/JP99/04039

§ 371 (c)(1),
(2), (4) Date: Jun. 14, 2000

(87) PCT Pub. No.: WO00/23289

PCT Pub. Date: Apr. 27, 2000

(30) Foreign Application Priority Data

Oct. 20, 1998 (JP) ............................. 10-297929

(51) Int. Cl.$^7$ .............................. B60C 9/18; B60C 9/28
(52) U.S. Cl. ...................... 152/526; 152/532; 152/535; 152/538
(58) Field of Search .................. 152/526, 532, 152/531, 535, 537, 538

(56) References Cited

U.S. PATENT DOCUMENTS 4,718,470 A  * 1/1988 Kusakabe et al. ........... 152/451
4,962,802 A  * 10/1990 Rohde ......................... 152/532
5,553,646 A  * 9/1996 Ando ...................... 152/209.14

FOREIGN PATENT DOCUMENTS

| EP | 0 698 509 A2 | 2/1996 | |
| EP | 0 701 912 A2 | 3/1996 | |
| FR | 2661870 | * | 11/1991 |
| GB | 1193411 | * | 6/1970 |
| JP | 02088306 | * | 3/1990 |
| JP | 3-23361 | | 3/1991 |
| JP | 3-23362 | | 3/1991 |
| JP | 06143920 | * | 5/1994 |
| JP | 10244808 | * | 9/1998 |

* cited by examiner

*Primary Examiner*—Michael W. Ball
*Assistant Examiner*—Justin Fischer
(74) *Attorney, Agent, or Firm*—Sughrue Mion, PLLC

(57) ABSTRACT

In a heavy duty radial tire, a reinforcement belt 8 outward in a radial direction of the tire and a high-strength belt 13 inward in the radial direction are arranged between a radial carcass 2 and a tread rubber 4, and an intersect angle between cord 6a of an innermost wide-width slant cord layer 6 in the reinforcement belt 8 and cord 12a of an outermost narrow-width slant cord layer 12 in the high-strength belt 13 is not less than 10° at an acute angle side, and narrow-width slant cord layers 11, 12 of the high-strength belt 13 in the tire mounted onto a rim and inflated under a maximum air pressure have a width corresponding to 20~60% of a ground contact width of the tread rubber 4, and inclination angles of cords 11a, 12a with respect to an equatorial plane 5 of the tire are not more than 15°, and a rubber gauge $t_1$ of a first rubber layer 14 between cord 6a of an innermost wide-width slant cord layer 6 and cord 12a of an outermost narrow-width slant cord layer 12 is 0.9~3.0 times a cord diameter D of the slant cord layer 11, 12.

7 Claims, 2 Drawing Sheets

HEAVY DUTY RADIAL TIRE

TECHNICAL FIELD

Figure 1:
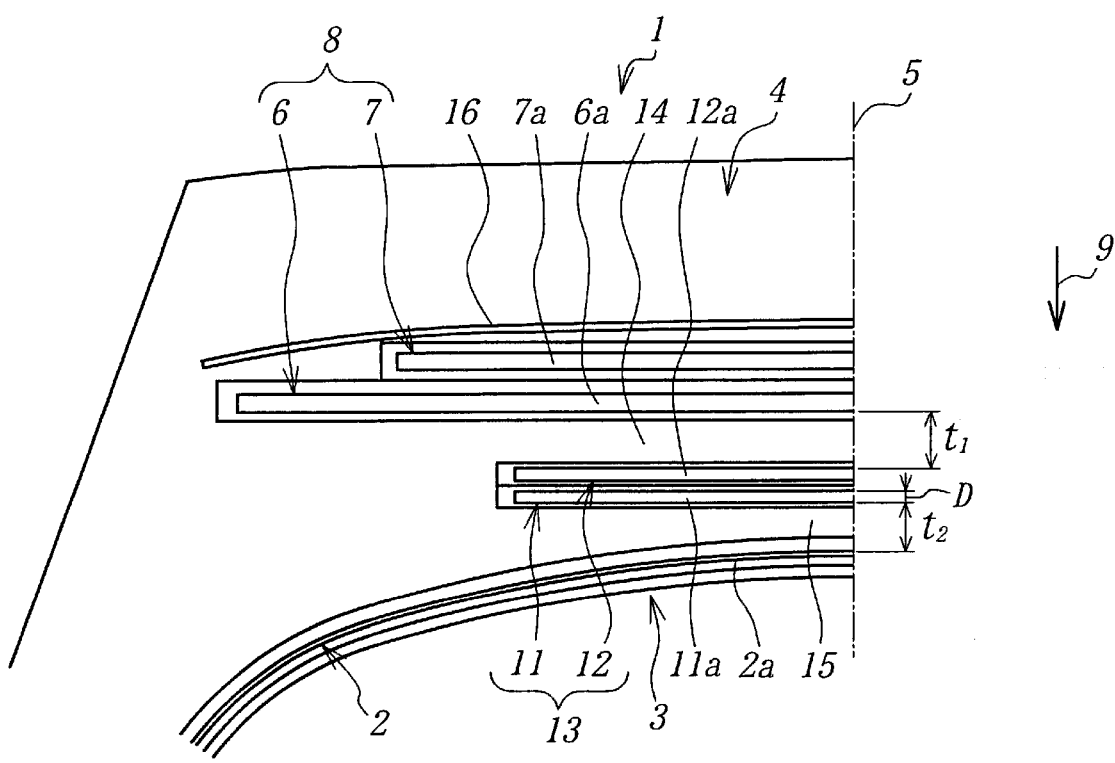

This invention relates to a heavy duty pneumatic radial tire used under a higher pressure and a higher load and suitable for construction vehicles mainly running on rough road, and more particularly to a heavy duty pneumatic radial tire capable of more improving the durability of the belt structure by arranging a high-strength belt comprised of at least one narrow-width slant cord layer between a crown portion of the known radial carcass and the known reinforcement belt for mitigating an action of a pressure applied from the radial carcass to the reinforcing belt accompanied with the expansion of the tire inflated under an air pressure.

BACKGROUND ART

The radial tire has a reinforcement belt comprised of wide-width rubberized slant cord layers for reinforcing a tread portion between a crown portion of a radial carcass and a tread rubber and developing so-called hoop effect and the like. And also, an inclination angle of the cord in each wide-width slant cord layer constituting the reinforcement belt with respect to an equatorial plane of the tire is usually set to be within a range of 20~40° for causing so-called pantograph deformation between ply cords of the radial carcass in a product tire followed by size growth in vulcanization building or the like to develop the reinforcing effect and the like. Furthermore, it is common that at least two layers among the wide-width slant cord layers are so-called cross cord layers cords of these layers are crossed to each other with respect to the equatorial plane of the tire.

When an internal pressure is applied to the tire having the above belt structure by filling an air pressure, the radial carcass indicates a tendency of approaching to a circular contour at its section at a state of arranging no reinforcing belt or at a non-hooped state.

However, since the tire is hooped with the reinforcement belt, the section of the crown portion in the radial carcass at the inflation under the internal pressure has actually a radius of curvature larger than a radius of curvature in the circle. This is simply that the reinforcement belt controls the deformation in a direction of decreasing the radius of curvature for approaching to the circle or in a direction of growing the size at the tire section. Particularly, a pressure is applied to a widthwise central portion of the reinforcement belt accompanied with a force of increasing the carcass size. On the other hand, both widthwise end portions of the reinforcement belt indicate a tendency of separating outward from the radial carcass in the radial direction of the tire. In case of the tire having such both end portions of the reinforcement belt, the belt durability in the tire tends to be degrade by repeatedly subjecting the tire to a large deformation during the running under a load. This tendency becomes particularly remarkable in heavy duty radial tires used under a higher internal pressure and a higher load.

In JP-B-3-23361, JP-B-3-23362 and the like is disclosed, for example, that it is useful to apply a laminate of two narrow-width slant cord layers, cords of which layers being crossed with each other with respect to the equatorial plane of the tire between the crown portion of the radial carcass and the reinforcement belt as means for mitigating the action of the pressure applied from the radial carcass accompanied with the increase of tire size at the inflation under the internal pressure to the reinforcement belt and to arrange a high-strength belt wherein the inclination angle of these laminated cords with respect to the equatorial plane of the tire is made smaller than the inclination angle of the cord in the wide-width slant cord layers constituting the reinforcement belt in view of the prevention of degrading the belt durability.

Since the reinforcement belt elongates through shearing deformation at a ground contact surface of the tire during the running under a load owing to its properties, there is usually a tendency of creating strain between the wide-width slant cord layers constituting the reinforcement belt due to these shearing deformation and elongation to cause separation failure. The inventor has examined the belt durability in the tire having the belt structure disclosed in the above publications and elucidated that the tire having such a belt structure controls separation failure between the wide-width slant cord layers but tends to easily cause separation failure between the high-strength belt and the reinforcement belt, and particularly that when the difference of the inclination angle between the cord in the innermost wide-width slant cord layer constituting the reinforcement belt and the cord in the outermost narrow-width slant cord layer constituting the high-strength belt is not less than 10°, separation failure is apt to be remarkably caused between the high-strength belt and the reinforcement belt and the cord in either one of the innermost slant cord layer and the outermost slant cord layer is apt to be broken in the worst case.

For this end, the inventor has further made various studies in order to prevent the occurrence of separation failure between the high-strength belt and the reinforcement belt and found that the occurrence of separation failure between the high-strength belt and the reinforcement belt can effectively be prevented by rationalizing a gauge of rubber located between the cord in the innermost wide-width slant cord layer constituting the reinforcement belt and the cord in the outermost narrow-width slant cord layer constituting the high-strength belt.

And also, it has been elucidated that the problem similar to that between the high-strength belt and the reinforcement belt may be caused even between the innermost narrow-width slant cord layer constituting the high-strength belt and the carcass ply. Even in this case, it has been found that the occurrence of separation failure between the high-strength belt and the carcass ply can effectively be prevented by rationalizing a gauge of rubber located between the innermost narrow-width slant cord layer constituting the high-strength belt and the ply cord constituting the radial carcass.

It is, therefore, an object of the invention to provide a heavy duty radial tire used under a higher pressure and a higher load and suitable for construction vehicles mainly running on rough road wherein separation failure apt to be caused between high-strength belt and reinforcement belt is effectively prevented to improve belt durability by arranging a high-strength belt between a crown portion of a radial carcass and a reinforcement belt and rationalizing a gauge of rubber located between cord in an outermost narrow-width slant cord layer constituting the high-strength belt and cord in an innermost wide-width slant cord layer constituting the reinforcement belt.

DISCLOSURE OF THE INVENTION

In order to achieve the above object, the invention lies in a heavy duty radial tire comprising a radial carcass toroidally extending between a pair of bead cores embedded in respective bead portions, a tread rubber, a reinforcement belt comprised of at least one wide-width rubberized slant cord layer containing cords arranged obliquely with respect to an equatorial plane and a high-strength belt located inside the reinforcement belt in a radial direction of the tire and comprised of at least one narrow-width rubberized slant cord layer containing cords arranged obliquely with respect to the equatorial plane of the tire wherein the reinforcement belt and the high-strength belt are arranged between a crown portion of the radial carcass and the tread rubber and an intersect angle between cord in an innermost wide-width slant cord layer constituting the reinforcement belt and cord in an outermost narrow-width slant cord layer constituting the high-strength belt is not less than 10° as measured at an acute angle side, characterized in that in a widthwise section of the tire when the tire is mounted onto an approved rim and inflated under a maximum air pressure corresponding to a maximum load capacity, the narrow-width slant cord layer constituting the high-strength belt has a width corresponding to 20~60% of a ground contact width of the tread rubber and an inclination cord angle of not more than 15° with respect to the equatorial plane of the tire, and a rubber gauge of a first rubber layer located between the cord in the outermost wide-width slant cord layer and the cord in the innermost narrow-width slant cord layer is within a range of 0.9~3.0 times a diameter of the cord in the narrow-width slant cord layer.

The term "approved rim" used herein means an applied rim in a kind of tires, tire size and ply rating described in the following standard ("Approved Rim", "Recommended Rim"), and the maximum load capacity and maximum air pressure adopt values described in the following standard.

That is, the standard is decided by an industrial standard effective in a zone manufacturing or using tires, which is, for example, "1999 Year Book" of "The Tire and Rim Association Inc." in USA, "Standard Manual 1999" of "The European Tire and Rim Technical Organization" in Europe, and "JATMA Year Book 1999" of "The Japan Automobile Tire Manufacturers Association Inc." in Japan.

Further, the term "wide-width slant cord layer" used herein concretely means a slant cord layer having a width corresponding to 65~85% of a ground contact width of the tread rubber.

Moreover, the term "ground contact width of tread rubber" used herein means a length of a line segment when the tire is mounted onto the approved rim and inflated under the maximum air pressure corresponding to the maximum load capacity and placed on a flat plate at a static state to determine ground contact end positions under a maximum load corresponding to the maximum load capacity and the ground contact end positions are connected along an axial direction of the tire at a state of turning no load.

Preferably, the high-strength belt has a lamination structure of two narrow-width slant cord layers, the cords of which layers being crossed with each other with respect to the equatorial plane, or is comprised of a single narrow-width slant cord layer.

And also, a rubber gauge of a second rubber layer located between ply cord located in the crown portion of the radial carcass and cord in the innermost narrow-width slant cord layer constituting the high-strength belt is within a range of 1.3~5.0 times a diameter of a cord in the narrow-width slant cord layer. In this way, the occurrence of separation failure between the radial carcass and the high-strength belt can more effectively be prevented to more improve the belt durability.

Moreover, the rubber gauges of the first rubber layer and the second rubber layer take values measured at the position on the equatorial plane of the tire.

In addition, it is preferable that the reinforcement belt has a cross cord layer comprised of two wide-width slant cord layers, the cords of which layers being crossed with each other with respect to the equatorial plane of the tire, that an inclination cord angle in the wide-width slant cord layers constituting the cross cord layer with respect to the equatorial plane of the tire is within a range of 10~40°, that rubber in the first rubber layer and the second rubber layer has a tensile stress at 100% elongation of 2.5~7.5 MPa, and that a protection layer comprised of a rubberized layer containing high-extensible cords arranged at an inclination angle of 15~40° with respect to the equatorial plane of the tire is arranged between the tread rubber and the reinforcement belt so as to cover the full surface of the reinforcement belt.

Moreover, the "tensile stress at 100% elongation" is measured at room temperature according to a definition of JIS K6301.

BEST MODE FOR CARRYING OUT THE INVENTION

A best mode for carrying out the invention will be described in detail with reference to FIG. 1 below.

FIG. 1 is a left-half section view of a main part of a crown portion of the heavy duty radial tire according to the invention.

In FIG. 1, numeral 1 is a heavy duty radial tire (hereinafter referred to as a tire), numeral 2 a radial carcass of one ply, numeral 3 a crown portion of the radial carcass 2, numeral 4 a tread rubber, numeral 5 an equatorial plane, numeral 8 a reinforcement belt, and numeral 13 a high-strength belt.

The tire 1 comprises the radial carcass 2 toroidally extending between a pair of bead cores (not shown) embedded in respective bead portions (not shown). And also, the tire 1 has the reinforcement belt 8 comprised of at least one layer, two wide-width rubberized slant cord layers 6, 7 in the illustrated embodiment, and the high-strength belt 13 located inside the reinforcement belt 8 in the radial direction and comprised of at least one layer, two narrow-width rubberized slant cord layers 11, 12 in the illustrated embodiment between the crown portion 3 of the radial carcass 2 and the tread rubber 4. Each of the slant cord layers 6, 7 and the slant cord layers 11, 12 has a lamination structure. The slant cord layers 6, 7 form a cross cord layer wherein cords 6a, 7a are extended obliquely with respect to the equatorial plane 5 of the tire and crossed with each other with respect to the equatorial plane 5 of the tire. And also, the slant cord layers 11, 12 form a cross cord layer wherein cords 11a, 12a are extended obliquely with respect to the equatorial plane 5 of the tire and crossed with each other with respect to the equatorial plane 5 of the tire. Particularly, an intersect angle between the cord 6a in the innermost wide-width slant cord layer 6 constituting the reinforcement belt 8 and the cord 12a in the outermost narrow-width slant cord layer 12 constituting the high-strength belt 13 is not less than 10° as measured at an acute angle side.

The reason why the intersect angle is restricted to not less than 10° is due to the fact that when it is less than 10°, a tension bearing ratio of the high-strength belt 13 decreases and tension corresponding to the decreased portion of the tension bearing ratio is applied to the reinforcement belt 8 and hence the separation resistance of the reinforcement belt 8 lowers. Although the occurrence of separation between the reinforcement belt 8 and the high-strength belt 13 becomes remarkable when the intersect angle is not less than 10° in the conventional tire, the invention is to effectively control the occurrence of separation failure between the reinforcement belt 8 and the high-strength belt 13.

Moreover, the high-strength belt 13 has a belt structure providing a highest rigidity among the existing belts and is enough to be comprised of one or two narrow-width slant cord layers. For example, when the high-strength belt 13 is comprised of three or more narrow-width slant cord layers, the rigidity too rises and there is a fear of lowering the enveloping property and the like and also there is caused an inconvenience that strain at an end portion of the high-strength belt 13 becomes large. In the present tires, particularly heavy duty tires, therefore, the number of the narrow-width slant cord layers constituting the high-strength belt is adaptable to be one or tow. For convenience' sake, the cords 6a, 7a, 11a, 12a of the slant cord layers 6, 7, 11, 12 are schematically shown by an oblong shape in FIG. 1.

A primary characteristic of the invention lies in that in a widthwise section of the tire 1 when the tire 1 is mounted onto an approved rim to form a tire-rim assembly and inflated under a maximum air pressure corresponding to a maximum load capacity, each of the narrow-width slant cord layers 11, 12 constituting the high-strength belt 13 has a width corresponding to 20~60% of a ground contact width of the tread rubber 4, and an inclination cord angle of the cords 11a, 12a with respect to the equatorial plane 5 of the tire is not more than 15°, and a rubber gauge $t_1$ of the first rubber layer 14 located between the cord 6a in the outermost wide-width slant cord layer 6 and the cord 12a in the innermost narrow-width slant cord layer 12 is within a range of 0.9~3.0 times a diameter D (mm) of the cord 11a, 12a in the narrow-width slant cord layer 11, 12. By rationalizing the rubber gauge $t_1$ of the first rubber layer 14 can effectively be controlled the occurrence of separation failure apt to be caused between the reinforcement belt 8 and the high-strength belt 13. The approved rim, maximum load capacity and maximum air pressure are according to the above standard and also the ground contact width is according to the above definition.

Moreover, the reason why the rubber gauge $t_1$ of the first rubber layer 14 is restricted to a range of 0.9~3.0 times the diameter D of the cord 11a, 12a of narrow-width slant cord layer 11, 12 is as follows. That is, when the rubber gauge $t_1$ of the first rubber layer 14 is less than 0.9×D (mm), the rubber gauge of the first rubber layer 14 becomes too thin and the cord 6a in the innermost wide-width slant cord layer 6 constituting the reinforcement belt 8 is close to the cord 12a in the outermost narrow-width slant cord layer 12 constituting the high-strength belt 13 and hence shearing strain produced between these layers can not effectively be reduced and the occurrence of separation failure can not sufficiently be prevented. On the other hand, when the rubber gauge $t_1$ (mm) of the first rubber layer 14 exceeds 3.0×D (mm), the rubber gauge of the first rubber layer 14 becomes too thick and the effect as the reinforcement belt 8, concretely hoop effect of the cross cord layer in the size growth of the tire 1 when the reinforcement belt 8 has a cross cord layer structure can not sufficiently be developed. In other words, the rigidity of the reinforcement belt 8 extremely lowers and the effect of controlling the size growth is degraded.

And also, the reason why the width of the narrow-width slant cord layer 11, 12 is restricted to a range of 20~60% of the ground contact width of the tread rubber 4 is due to the fact that when the width of the narrow-width slant cord layer 11, 12 exceeds 60% of the ground contact width, strain at the end portion of the slant cord layer 11, 12 violently increases, while when it is less than 20% of the ground contact width, pressure applied from the radial carcass 2 to the reinforcement belt 8 in the inflation of the tire 1 under the internal pressure can not sufficiently be decreased.

Further, the reason why the inclination angle of the cord 11a, 12a in the narrow-width slant cord layer 11, 12 is restricted to not more than 15° is due to the fact that when the inclination angle exceeds 15°, the hoop effect is insufficient and pressure applied from the radial carcass 2 to the reinforcement belt 8 under the inflation of the internal pressure can not sufficiently be decreased.

Moreover, there is a tendency that separation failure is apt to be caused between the radial carcass 2 and the high-strength belt 13 from the same reason as in the case between the reinforcement belt 8 and the high-strength belt 13.

Figure 2:
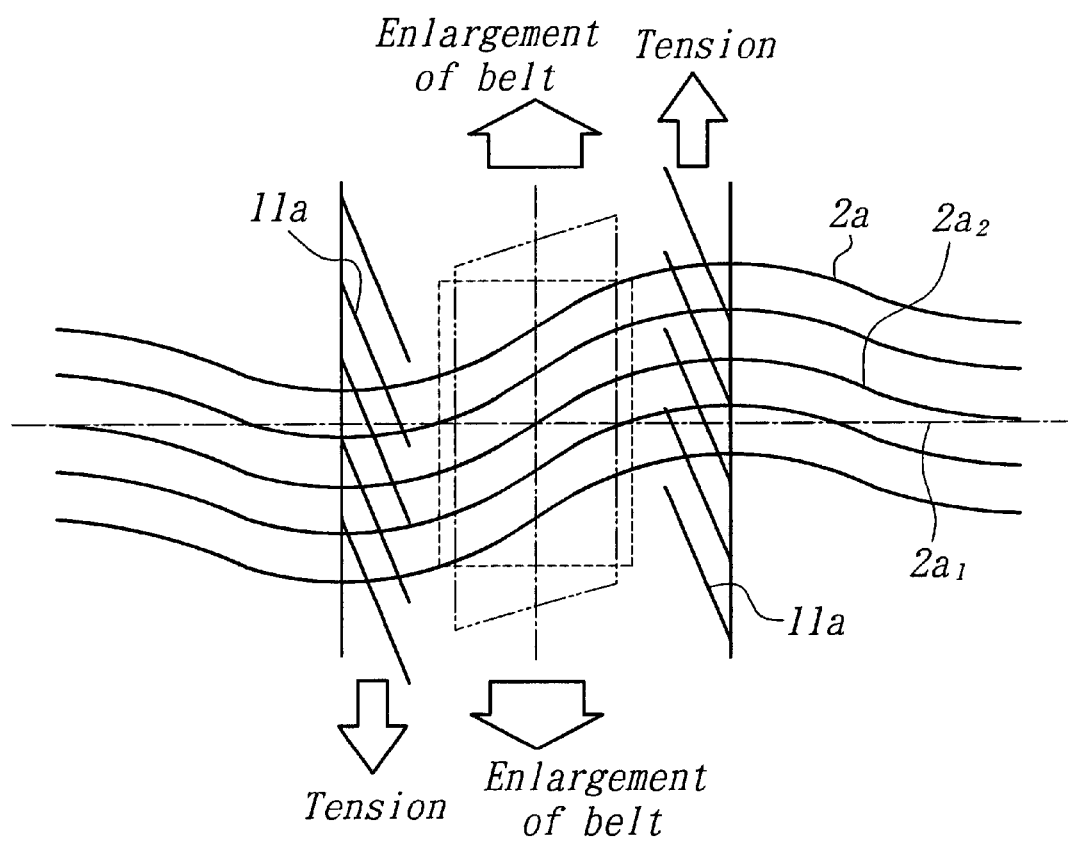

In addition to this tendency, a problem as shown in FIG. 2 is caused when the ply cords 2a of the radial carcass 2 come extremely close to the cords 11a of the innermost narrow-width slant cord layer 11 constituting the high-strength belt 13 in the tire production. FIG. 2 is a diagrammatic view illustrating a state of changing the ply cords of the radial carcass in the conventional tire into a wavy form accompanied with the shearing deformation of the innermost narrow-width slant cord layer in the vulcanization building of the tire. As shown in FIG. 2, the above problem means that in the conventional tire, the ply cord $2a_1$, (shown by a dot-dash line) before the vulcanization building is rendered into the wavy ply cord $2a_2$ after the vulcanization building (shown by a solid line). That is, the high-strength belt 13 is required to be enlarged to a certain level from a stage of building an uncured tire wherein an uncured cord layer member is shaped into a ring on a BT drum in an apparatus for previously laying an uncured cord layer member and an uncured tread rubber up to a product tire. In this case, the belt is stretched by shearing deformation at the vulcanization building. The ply cord $2a_1$ is drawn by the shearing deformation of the cord 11a in the innermost narrow-width slant cord layer 11 constituting the high-strength belt 13 and tends to deform into the wavy ply cord $2a_2$. This phenomenon remarkably appears when the enlargement ratio of the high-strength belt 13 is not less than 5% and the inclination angle of the cord 11a in the innermost narrow-width slant cord layer 11 with respect to the equatorial plane 5 of the tire is not more than 15°. Such a wavy ply cord $2a_2$ is unfavorable because compression strain is locally applied during the running of the tire 1 under a load.

Therefore, it is necessary to effectively prevent the occurrence of separation failure between the radial carcass 2 and the high-strength belt 13 and at the same time prevent the change of the ply cord 2a into the wavy form. For this end, it is favorable that a rubber gauge $t_2$ (mm) of a second rubber layer 15 located between ply cord 2a located in the crown portion 3 of the radial carcass 2 and cord 11a in the innermost narrow-width slant cord layer 11 constituting the high-strength belt 13 is within a range of 1.3~5.0 times a diameter D (mm) of the cord 11a, 12a in the narrow-width slant cord layer 11, 12. The diameters D (mm) of the cords 11a, 12a are the same.

The reason why the rubber gauge $t_2$ of the second rubber layer 15 is restricted to a range of 1.3~5.0 times a diameter D of the cord 11a, 12a in the narrow-width slant cord layer 11, 12 is as follows. That is, when the rubber gauge $t_2$ of the second rubber layer 15 is less than 1.3×D (mm), the rubber gauge $t_2$ of the second rubber layer 15 becomes too thin and hence the shearing strain produced between the radial carcass 2 and the innermost narrow-width slant cord layer 11 constituting the high-strength belt 13 can not be decreased and the occurrence of separation failure can not sufficiently be prevented. In addition, the ply cord 2a is unfavorably drawn by the deformation of the cord 11a in the innermost narrow-width slant cord layer 11 of the high-strength belt 13 to indicate the wavy form in the vulcanization building.

On the other hand, when the rubber gauge $t_2$ of the second rubber layer 15 exceeds 5.0×D (mm), the rubber gauge $t_2$ of the second rubber layer 15 becomes too thick and hence the effect as the reinforcement belt, concretely hoop effect of the cross cord layer in the size growth of the tire 1 when the reinforcement belt 8 has a cross cord layer structure can not sufficiently be developed. In other words, the rigidity of the reinforcement belt 8 extremely lowers and the effect of controlling the size growth is degraded.

Since the tire 1 according to the invention is used under conditions of high internal pressure and high load, as shown in FIG. 1, the reinforcement belt 8 is adaptable to be a cross cord layer comprised of two laminated wide-width slant cord layers 6, 7, cords 6a, 7a of which layers being crossed with each other with respect to the equatorial plane 5 of the tire. In this case, the inclination angles of the cords 6a, 7a in the wide-width slant cord layers 6, 7 constituting the cross cord layer are adaptable within a range of 10~40° with respect to the equatorial plane 5 of the tire, respectively. The above range of the inclination angle is effective for preventing the trouble of cut through the wide-width slant cord layer 6, 7 because when the tire 1 rides over projections existing on a road surface such as small stones, rocks and the like, even if the projection passes through the tread rubber 4 to arrive at the reinforcement belt 8, the wide-width slant cord layer 6, 7 has a flexibility.

And also, when it is required to protect the reinforcement belt 8 from the projections, it is effective to arrange a protection layer 16 made of a rubberized layer containing high-extensible cords arranged at an inclination angle of 15~40° with respect to the equatorial plane E between the tread rubber 4 and the reinforcement belt 8 so as to cover the full surface of the reinforcement belt 8. As the high-extensible cord, it is favorable to use cords having, for example, an elongation at break of not less than 4%.

Although the first rubber layer 14 and the second rubber layer 15 shown in FIG. 1 are made of rubber other than coating rubber constituting the slant cord layers 6, 7, 11, 12, each of the first rubber layer 14 and the second rubber layer 15 may be made of only the coating rubber constituting the slant cord layer 6, 7, 11, 12, so that rubber material is not particularly restricted. And also, rubber in the first rubber layer 14 and the second rubber layer 15 is suitable to have a tensile stress at 100% elongation of 2.5~7.5 MPa.

Although the above shows only an embodiment of the best mode of the invention, various modifications may be made within the scope of the invention.

There are prepared six kinds of the tire 1 as an example according to the invention and the durability thereof is evaluated as follows.

Each tire of Examples 1~6 is a radial ply tire for construction vehicle having a tire size of 37.00R57. The width (mm) of slant cord layers 11, 12 constituting the high-strength belt 13 (only one slant cord layer 11 in Example 6), inclination angle (°) and diameter D (mm) of cord 11a, 12a, width (mm) of slant cord layer 6, 7 constituting the reinforcement belt 8, inclination angle (°) of cord 6a, 7a, width (mm) of protection layer 16 and inclination cord angle (°) thereof, rubber gauge $t_1$ (mm) of first rubber layer 14 and rubber gauge $t_2$ (mm) of second rubber layer 15 are shown in Table 1.

The radial carcass 2 is made of one ply and steel cords are used as a ply cord 2a. The cord diameter is 3.2 mm. The tread rubber 4 has a ground contact width of 840 mm. The other tire structure is substantially the same as that of the conventional radial ply tire for construction vehicle according to custom. In order to evaluate the belt durability level in each example tire, there are prepared a conventional tire having only the reinforcement belt made of four wide-width slant cord layers without using the high-strength belt 13 and tires of Comparative examples 1~4 wherein the rubber gauge t1 of the first rubber layer 14 is outside the adequate range and dimensions of these tires are also shown in Table 1.

TABLE 1

| | High-strength belt 13 | | | | | Reinforcement belt 8 | | | | Protection layer 16 | | First rubber layer 14 | Second rubber layer 15 |
|---|---|---|---|---|---|---|---|---|---|---|---|---|---|
| | innermost layer 11 | | outermost layer 12 | | | inner most layer 6 | | outermost layer 7 | | | | | |
| | width (mm) | inclination cord angle *1 (°) | width (mm) | inclination cord angle *1 (°) | cord diameter D (mm) | width (mm) | inclination cord angle *1 (°) | width (mm) | inclination cord angle *1 (°) | width (mm) | inclination cord angle *1 (°) | rubber gauge $t_1$ (mm) | rubber gauge $t_2$ (mm) |
| Conventional Example | high-strength belt: none, reinforcement belt: 4 layers → innermost layer: width 600 mm, R27°, middle lower layer: width 740 mm, L25°, middle upper layer: width 660 mm, R22°, outermost layer: width 500 mm, L22°, cord diameter: 2.8 mm, rubber gauge of first rubber layer: 2.2 mm, rubber gauge of second rubber layer: 3.6 mm, protection layer: width 800 mm, L22° | | | | | | | | | | | | |
| Comparative Example 1 | 380 | R5 | 340 | L5 | 2.8 | 660 | R22 | 500 | L22 | 800 | L22 | 1.5 | 3.2 |
| Comparative Example 2 | 380 | R5 | 340 | L5 | 2.8 | 660 | R22 | 500 | L22 | 800 | L22 | 1.8 | 4.5 |
| Comparative Example 3 | 380 | R5 | 340 | L5 | 2.8 | 660 | R22 | 500 | L22 | 800 | L22 | 9.0 | 5.0 |
| Comparative Example 4 | 440 | R5 | — | — | 3.0 | 660 | L20 | 500 | R20 | 800 | R25 | 1.5 | 3.5 |
| Example 1 | 380 | R5 | 340 | L5 | 2.8 | 660 | R22 | 500 | L22 | 800 | L22 | 2.9 | 3.6 |
| Example 2 | 380 | R5 | 340 | L5 | 2.8 | 660 | R22 | 500 | L22 | 800 | L22 | 2.4 | 7.5 |
| Example 3 | 380 | R5 | 340 | L5 | 2.8 | 660 | R22 | 500 | L22 | 800 | L22 | 4.0 | 8.5 |
| Example 4 | 220 | R7 | 200 | L7 | 2.5 | 580 | L30 | 450 | R25 | 800 | L22 | 2.5 | 3.3 |
| Example 5 | 300 | L10 | 250 | R10 | 3.0 | 600 | L30 | 530 | R25 | 800 | L22 | 9.0 | 15.0 |
| Example 6 | 440 | R5 | — | — | 3.0 | 660 | L20 | 500 | R20 | 800 | R25 | 3.0 | 4.8 |

*1: In the column of inclination cord angle, [R] is upward to the right, and [L] is upward to the left.

The belt durability of each tire is evaluated under the following test conditions. That is, the tire is mounted onto an approved rim (rim contour: 27.00 inch, rim width: 27.00 inch, rim diameter: 57 inch) and the tire-rim assembly is inflated under a maximum air pressure of 700 kPa and run on a drum rotating at a periphery velocity of 15 km/h at a state of pushing under a load of 51500 kgf corresponding to a maximum load capacity for 300 hours. After the completion of the running, the tire is cut to measure a separation length between the reinforcement belt 8 and the high-strength belt 13 (crack length) and separation length between the high-strength belt 13 and the radial carcass 2 (crack length), whereby the belt durability is evaluated. The measured results are shown in Table 2. The numerical values in Table 2 are represented by an index on the basis that the separation length of Comparative Example 1 is 100. The smaller the index value, the better the property.

TABLE 2

|  | Separation between layers *1 | Separation between layers *2 |
|---|---|---|
| Conventional Example | 120 | 123 |
| Comparative Example 1 | 100 | 100 |
| Comparative Example 2 | 98 | 97 |
| Comparative Example 3 | 97 | 98 |
| Comparative Example 4 | 99 | 99 |
| Example 1 | 81 | 92 |
| Example 2 | 95 | 88 |
| Example 3 | 86 | 73 |
| Example 4 | 73 | 86 |
| Example 5 | 61 | 84 |
| Example 6 | 83 | 78 |

*1: Evaluation of separation by crack length between innermost wide-width slant cord layer 6 and outermost narrow-width slant cord layer 12.
*2: Evaluation of separation by crack length between innermost narrow-width slant cord layer 11 and carcass ply 2.

As seen from the results of Table 2, all tires of Examples 1~6 are considerably excellent in the belt durability as compared with the tire of Comparative Example 1 wherein the rubber gauges of the first rubber layer 14 and the second rubber layer 15 are outside the adequate ranges. And also, the sufficient belt durability can not be obtained in the tires of Comparative Examples 2~4 because the rubber gauge $t_1$ of the first rubber layer 14 is outside the adequate range of the invention.

INDUSTRIAL APPLICABILITY

According to the invention, strain between the wide-width slant cord layers 6 and 7 constituting the reinforcement belt 8 can be decreased by arranging the high-strength belt 3 to prevent the separation failure between these layers 6 and 7, and separation failure apt to be caused between the high-strength belt 13 and the reinforcement belt 8 can effectively be prevented by rationalizing the rubber gauge t1 of the first rubber layer 14, and consequently there can be provided heavy duty radial tires having an excellent belt durability, particularly a heavy duty radial tire suitable for use in a construction vehicle mainly running on rough road or the like.

And also, separation failure between the radial carcass 2 and the high-strength belt 13 can effectively be prevented and the occurrence of the problem causing the wavy formation of the ply cord 2a can be prevented by rationalizing the rubber gauge $t_2$ of the second rubber layer 15 located between the ply located in the crown portion of the radial carcass 2 and the innermost narrow-width slant cord layer 11 constituting the high-strength belt 13.

Furthermore, when the reinforcement belt 8 is a cross cord layer, the inclination angles of the cords 6a, 7a in the wide-width slant cord layers 6, 7 constituting the cross cord layer with respect to the equatorial plane 5 of the tire is made to a range of 10~40°, respectively, so that when the tire rides on projections existing on a road surface such as small stones, rocks and the like and the projection passes through the tread rubber 4 to arrive at the reinforcement belt 8, it is difficult to cause the trouble of cut through the reinforcement belt 8 because the reinforcement belt 8 has a flexibility, whereby the belt durability is also improved.

Moreover, the arrival of the projection at the reinforcement belt 8 through the tread rubber 4 can effectively be prevented by arranging the protection layer 16 made of the rubberized layer containing high-extensible cords arranged at an inclination angle of 15~40° with respect to the equatorial plane of the tire between the tread rubber 4 and the reinforcement belt 8 so as to cover the full surface of the reinforcement belt 8.

In addition, each of the first rubber layer 14 and the second rubber layer 15 is made of rubber having a tensile stress at 100% elongation of 2.5~7.5 MPa, whereby the belt durability can be more improved.

What is claimed is:

1. A heavy-duty radial tire comprising: a radial carcass toroidally extending between a pair of bead cores embedded in respective bead portions; a tread rubber; a reinforcement belt comprised of at least one wide-width rubberized slant cord layer containing cords arranged obliquely with respect to an equatorial plane; a high strength belt located inside the reinforcement belt in a radial direction of the tire and comprised of at least one narrow-width rubberized slant cord layer containing cords arranged obliquely with respect to the equatorial plane of the tire, wherein:

the reinforcement belt and the high strength belt are arranged between a crown portion of the radial carcass and the tread rubber;

an intersect angle between a cord in a radially innermost wide-width slant cord layer constituting the reinforcement belt and a cord in a radially outermost narrow-width slant cord layer constituting the high strength belt is not less than 10° as measured at an acute angle side;

in a widthwise section of the tire when the tire is mounted onto an approved rim and inflated under maximum air pressure corresponding to a maximum load capacity, the at least one narrow-width slant cord layer constituting the high strength belt has a width corresponding to 20–60% of a ground contact width of the tread rubber and an inclination angle of not more than 15° with respect to the equatorial plane of the tire;

a first rubber layer is located between the radially innermost wide-width slant cord layer and the radially outermost narrow-width slant cord layer; and a rubber gauge between the cord in the radially innermost wide-width slant cord layer and the cord in the radially outermost slant cord layer is within a range of 0.9–3.0 times a diameter of the cord in the radially outermost narrow-width slant cord layer.

2. A heavy duty radial tire according to claim 1, wherein the high-strength belt comprises two narrow-width slant cord layers laminated one upon the other, the cords of which layers being crossed with each other with respect to the equatorial plane.

3. A heavy duty radial tire according to claim 1, wherein the high-strength belt is comprised of a single narrow-width slant cord layer.

4. A heavy duty radial tire according to claim 1, wherein a rubber gauge of a second rubber layer located between a ply cord located in the crown portion of the radial carcass and a cord in the radially innermost narrow-width slant cord layer constituting the high-strength belt is within a range of 1.3~5.0 times a diameter of a cord in the radially innermost narrow-width slant cord layer.

5. A heavy duty radial tire according to claim 1, wherein the reinforcement belt has a cross cord layer comprised of two wide-width slant cord layers, the cords of which layers being crossed with each other with respect to the equatorial plane of the tire, and an inclination cord angle in the wide-width slant cord layers constituting the cross cord layer with respect to the equatorial plane of the tire is within a range of 10~40°.

6. A heavy duty radial tire according to claim 4, wherein rubber in the first rubber layer and the second rubber layer has a tensile stress at 100% elongation of 2.5~7.5 MPa.

7. A heavy duty radial tire according to claim 1, wherein a protection layer comprised of a rubberized layer containing high-extensible cords arranged at an inclination angle of 15~40° with respect to the equatorial plane of the tire is arranged between the tread rubber and the reinforcement belt so as to cover the full surface of the reinforcement belt.

* * * * *